United States Patent
Resler et al.

(10) Patent No.: US 7,665,841 B2
(45) Date of Patent: Feb. 23, 2010

(54) CHILDREN'S SUNGLASSES

(76) Inventors: Renee Resler, 6720 E. 6th St., Scottsdale, AZ (US) 85251; Gary W. Hall, 151 Kahiki Dr., Florida, AZ (US) 33070

( * ) Notice: Subject to any disclaimer, the term of this patent is extended or adjusted under 35 U.S.C. 154(b) by 0 days.

(21) Appl. No.: 12/058,239

(22) Filed: Mar. 28, 2008

(65) Prior Publication Data
US 2008/0170198 A1 Jul. 17, 2008

Related U.S. Application Data

(63) Continuation-in-part of application No. 11/967,364, filed on Dec. 31, 2007, now abandoned, which is a continuation of application No. 11/591,751, filed on Nov. 2, 2006, now Pat. No. 7,314,278, which is a continuation of application No. 10/997,113, filed on Nov. 24, 2004, now Pat. No. 7,140,729.

(51) Int. Cl.
*G02C 3/00* (2006.01)
(52) U.S. Cl. .............................. 351/156; 351/41; 351/44
(58) Field of Classification Search .................... 351/86, 351/83, 156, 44, 41, 157, 106, 103, 111, 351/123
See application file for complete search history.

(56) References Cited

U.S. PATENT DOCUMENTS

| | | | | |
|---|---|---|---|---|
| 4,317,240 A | * | 3/1982 | Angerman et al. | 2/436 |
| 5,818,569 A | * | 10/1998 | Berent | 351/156 |
| 6,530,659 B1 | * | 3/2003 | Marcum | 351/41 |
| 7,249,842 B2 | * | 7/2007 | Conrad et al. | 351/83 |

* cited by examiner

*Primary Examiner*—Hung X Dang
(74) *Attorney, Agent, or Firm*—Parsons & Goltry; Michael W. Goltry; Robert A. Parsons

(57) ABSTRACT

Sunglasses includes a frame portion having opposing inner and outer faces, opposed first and second sides, a nose bridge formed between the opposed first and second sides, and a lens opening between the nose bridge and each of the first and second sides. A lens-defining member, made of a flexible, thin, sun-protective, light-transmitting material, has an outer face applied to the inner face of the frame portion and an opposing inner face, and a side in juxtaposition to each of the first and second sides of the frame portion. Fasteners affix the lens-defining member to the frame portion, and first and second temples extend rearwardly of the frame portion at the first and second sides of the frame portion, respectively.

5 Claims, 15 Drawing Sheets

CHILDREN'S SUNGLASSES

FIELD OF THE INVENTION

The present invention relates to sunglasses and, more particularly, to children's sunglasses, such as for infants and small children.

BACKGROUND OF THE INVENTION

Everyone is at risk for eye damage from the sun. The same harmful rays that damage skin can also increase the risk of developing eye problems. Some of the long-term effects of UV radiation happen slowly and painlessly. Research has found that UV and other sun rays are involved in many of the serious eye disorders people experience today.

In the short-term, people who spend long hours on the beach or in the snow without adequate eye protection can develop photokeratitis, sunburn of the cornea, which can cause temporary loss of vision. The sunlight's reflection off of snow, sand or water, further increases a person's exposure to solar radiation.

Most people are unfamiliar with the sensitive nature of their eyes. According to optometrists and ophthalmologists, there are three surfaces within the eye that can be adversely affected by sunlight—the cornea and conjunctiva (snow-blindness and pterygium), the lens (cataracts), and the retina (eclipse blindness and macular degeneration). These surfaces perform different functions that work together as the backbone of the eye structure. In addition, the eyelids are at risk of developing skin cancer from UV exposure.

To protect eyes from both short and long-term damage, people should wear sunglasses that block the sun's harmful rays. Pricey sunglasses or glasses with a dark tint don't always offer more protection. People should look for labels that specifically say the glasses offer 99 percent to 100 percent UV protection. Some eye-care professionals can also test the UV protection level of sunglasses for a customer.

Tint of the sunglass lens does play a role in the amount of protection. Amber or brown lenses, for example, may distort colors. However, they will attenuate most or all of the shortest wavelengths in the visible spectrum, which may contribute to macular degeneration in the retina.

The style or frame coverage of the sunglass also affects the amount of scattered or reflected harmful radiation, which can reach the eye without transmitting through the lens. Wrap-around sunglasses, which fit close to the face offer more solar protection than small frames.

People who wear contact lenses that offer UV protection should still wear sunglasses for total eye protection.

Children should also wear sunglasses that indicate a high UV-protection level, and not toy glasses without a label. Polycarbonate lenses are generally recommended for children because they are the most shatter-resistant.

The prior art has provided numerous specific configurations of children's sunglasses. None, however, have proven to be entirely satisfactory. Some prior art children's sunglasses are difficult to construct, expensive, and so uncomfortable to wear that children refuse to wear them. Moreover, some children's sunglasses are not suitable for very small children or infants, as the frames and other parts are relatively rigid and subject to breaking, which products have relatively sharp edges that can injure an infant or small child, or small parts which may break free causing injury.

SUMMARY OF THE INVENTION

It is an object of the invention to provide sunglasses that are specifically-adapted to be worn by infants and children which are low in cost, which are safe, which are disposable, which are comfortable, and that are easy to assemble and convenient to use.

According to the invention, provided are sunglasses for infants and children including an elongate integral member that consists of a central portion having opposing outer and inner faces, a central nose bridge, a lens opening on each side of the central nose bridge, and a temple extending from each side of the central portion, in which each of the temples has an outer face that is congruent with the outer face of the central portion and an inner face that is congruent with the inner face of the central portion. A lens-defining member, made of a flexible, thin, sun-protective, light-transmitting material, has an outer face affixed to the inner face of the central portion and an opposing inner face. The lens-defining member is substantially coextensive relative to the central portion and has a side in juxtaposition to each of the sides of the central portion. An elongate integral backing has an outer face affixed to the inner face of the lens-defining member and an opposing inner face, in which the backing is substantially coextensive relative to, and a substantial mirror image of, the central portion including a central nose bridge opposing the central nose bridge of the central portion, a lens opening on each side of the central nose bridge opposing the lens opening on each side of the central portion, and a side in juxtaposition to each of the sides of the central portion. A nose bridge pad is affixed to the inner face of the backing at the nose bridge thereof. The temples each have a free end, and an engagement assembly is provided for releasably retaining the free end of one of the temples to the free end of the other of the temples. In a preferred embodiment, the engagement assembly includes a hook and loop fastener having an element thereof carried at the free end of one of the temples and a complemental element thereof carried at the free end of the other of the temples. Preferably, the elongate integral member is made of a foam material, the backing is made of a foam material, and the nose bridge pad is made of a foam material. In a particular embodiment, the nose bridge pad is adhesively affixed to the inner face of the backing. In another embodiment, the nose bridge pad is integrally affixed to the inner face of the backing.

According to the invention, there is provided a method of fabricating sunglasses includes 1) providing an elongate integral member, the elongate integral member including a central portion having opposing outer and inner faces, a central nose bridge, and a lens opening on each side of the central nose bridge; 2) providing a lens-defining member, made of a flexible, thin, sun-protective, light-transmitting material, having opposing outer and inner faces, opposing sides, and that is substantially coextensive relative to the central portion; 3) providing an elongate integral backing that is substantially coextensive relative to, and a substantial mirror image of, the central portion, the backing having opposing outer and inner faces, opposing sides, a central nose bridge, and a lens opening on each side of the central nose bridge; and 4) affixing the outer face of the lens-defining member to the inner face of the central portion, and affixing the outer face of the backing to the inner face of the lens-defining member, wherein the sides of the lens-defining member juxtaposed relative to the sides of the backing, respectively. The instant method further includes affixing a nose bridge pad to the inner face of the backing at the nose bridge thereof. The temples each have a free end, and the method further includes providing an engagement assembly for releasably retaining the free end of one of the temples to the free end of the other of the temples. In a preferred embodiment, the engagement assembly includes a hook and loop fastener having an element thereof carried at the free end of one of the temples and a complemental element thereof carried at the free end of the other of the temples. Preferably, the elongate integral member is made of a foam material, the backing is made of a foam material, and the nose bridge pad is made of a foam material. In a particular embodiment, the step of affixing the nose bridge pad further includes adhesively affixing the nose bridge pad. In another embodiment, the step of affixing the nose bridge pad further includes integrally affixing the nose bridge pad.

According to the invention, provided are sunglasses for infants and children including an elongate integral member that consists of a central portion having opposing outer and inner faces, a central nose bridge, a lens opening on each side of the central nose bridge, and a temple extending rearwardly of the inner face from a bend in the elongate integral member on each side of the central portion. Each of the temples has an outer face that is congruent with the outer face of the central portion, and an inner face that is congruent with the inner face of the central portion. A lens-defining member is made of a flexible, thin, sun-protective, light-transmitting material, which has an outer face affixed to the inner face of the central portion and an opposing inner face, wherein the lens-defining member is substantially coextensive relative to the central portion, and a side in juxtaposition to each of the bends of the central portion. An elongate integral backing has an outer face affixed to the inner face of the lens-defining member, and an opposing inner face. The backing is substantially coextensive relative to, and a substantial mirror image of, the central portion, and includes a central nose bridge opposing the central nose bridge of the central portion, a lens opening on each side of the central nose bridge opposing the lens opening on each side of the central portion, and a side in juxtaposition to each of the bends of the central portion. A nose bridge pad is affixed to the inner face of the backing at the nose bridge thereof. A temple pad is affixed to the inner face of the backing at each side thereof and to the inner face of each of the temples maintaining the bends in the elongate integral member. The temples each have a free end, and an engagement assembly is provided for releasably retaining the free end of one of the temples to the free end of the other of the temples. Preferably, the engagement assembly includes a hook and loop fastener having an element thereof carried at the free end of one of the temples and a complemental element thereof carried at the free end of the other of the temples. Preferably, the elongate integral member is made of a foam material, the backing is made of a foam material, and the nose bridge pad and the temple pads are each made of a foam material. In one embodiment, the nose bridge pad is adhesively affixed to the inner face of the backing. In another embodiment, the nose bridge pad is integrally affixed to the inner face of the backing. In one embodiment, the temple pads are adhesively affixed to the inner face of the backing. In one embodiment, the temple pads are adhesively affixed to the inner faces of the temples, respectively. In another embodiment, the temple pads are integrally affixed to the inner face of the backing.

According to the invention, there is provided a method of fabricating sunglasses suitable for infants and children including steps of 1) providing an elongate integral member, the elongate integral member including a central portion having opposing outer and inner faces, a central nose bridge, and a lens opening on each side of the central nose bridge; 2) providing a lens-defining member, made of a flexible, thin, sun-protective, light-transmitting material, having opposing outer and inner faces, opposing sides, and that is substantially coextensive relative to the central portion; 3) providing an elongate integral backing that is substantially coextensive relative to, and a substantial mirror image of, the central portion, the backing having opposing outer and inner faces, opposing sides, a central nose bridge, and a lens opening on each side of the central nose bridge; 4) affixing the outer face of the lens-defining member to the inner face of the central portion, and affixing the outer face of the backing to the inner face of the lens-defining member, wherein the sides of the lens-defining member juxtaposed relative to the sides of the backing, respectively; 5) bending the elongate integral member rearwardly of the inner face thereof at the juxtaposed sides of the lens-defining member and the backing forming bends and temples in the elongate integral member; 6) the temples each having an outer face that is congruent to the outer face of the central portion and an inner face that is congruent with the inner face of the central portion; 7) affixing a nose bridge pad to the inner face of the backing at the nose bridge thereof; and 8) affixing a temple pad to the inner face of the backing at each side thereof and to the inner face of each of the temples maintaining the bends in the elongate integral member. The temples each have a free end, and the method further includes providing an engagement assembly for releasably retaining the free end of one of the temples to the free end of the other of the temples. Preferably, the engagement assembly includes a hook and loop fastener having an element thereof carried at the free end of one of the temples and a complemental element thereof carried at the free end of the other of the temples. Preferably, the elongate integral member is made of a foam material, the backing is made of a foam material, and the nose bridge pad and the temple pads are each made of a foam material. In one embodiment, the step of affixing the nose bridge pad further includes adhesively affixing the nose bridge pad. In another embodiment, the step of affixing the nose bridge pad further includes integrally affixing the nose bridge pad. In one embodiment, the step of affixing a temple pad to the inner face of the backing at each side thereof further includes adhesively affixing a temple pad to the inner face of the backing at each side thereof. In one embodiment, the step of affixing a temple pad to the inner face of each of the temples further includes adhesively affixing a temple pad to the inner face of each of the temples. In another embodiment, the step of affixing a temple pad to the inner face of the backing at each side thereof further includes integrally affixing a temple pad to the inner face of the backing at each side thereof.

According to the invention, there is provided sunglasses for infants and children including an elongate integral member that consists of a central portion having opposing outer and inner faces, a central nose bridge, a lens opening on each side of the central nose bridge, and a temple extending rearwardly of the inner face from a bend in the elongate integral member on each side of the central portion, in which each of the temples having an outer face that is congruent with the outer face of the central portion and an inner face that is congruent with the inner face of the central portion. A lens-defining member, made of a flexible, thin, sun-protective, light-transmitting material, has an outer face affixed to the inner face of the central portion and an opposing inner face. The lens-defining member is substantially coextensive relative to the central portion and has a side in juxtaposition to each of the bends of the central portion. An elongate integral backing is affixed to the inner face of the lens-defining member including a central nose bridge opposing the central nose bridge of the central portion, a lens opening on each side of the central nose bridge opposing the lens opening on each side of the central portion, a side in juxtaposition to each of the bends of the central portion, a nose bridge pad at the nose bridge of the backing, and a temple pad at each side of the backing and affixed to the inner face of each of the temples maintaining the bends in the elongate integral member. The temples each have a free end, and an engagement assembly is provided for releasably retaining the free end of one of the temples to the free end of the other of the temples. Preferably, the engagement assembly includes a hook and loop fastener having an element thereof carried at the free end of one of the temples and a complemental element thereof carried at the free end of the other of the temples. Preferably, the elongate integral member is made of a foam material, and the backing is made of a foam material.

According to the invention, there is provided a method of fabricating sunglasses suitable for infants and children including steps of 1) providing an elongate integral member, the elongate integral member including a central portion having opposing outer and inner faces, a central nose bridge, and a lens opening on each side of the central nose bridge; 2) providing a lens-defining member, made of a flexible, thin, sun-protective, light-transmitting material, having opposing outer and inner faces, opposing sides, and that is substantially coextensive relative to the central portion; 3) providing an elongate integral backing that is substantially coextensive relative to the central portion, the backing having a central nose bridge, a lens opening on each side of the central nose bridge, opposing sides, a nose bridge pad at the nose bridge of the backing, and a temple pad at each side of the backing; 4) affixing the outer face of the lens-defining member to the inner face of the central portion, and affixing the backing to the inner face of the lens-defining member, wherein the sides of the lens-defining member juxtaposed relative to the sides of the backing, respectively; 5) bending the elongate integral member rearwardly of the inner face thereof at the juxtaposed sides of the lens-defining member and the backing forming bends and temples in the elongate integral member; 6) the temples each having an outer face that is congruent to the outer face of the central portion and an inner face that is congruent with the inner face of the central portion; and 7) affixing the temple pads to the inner faces of the temples, respectively, maintaining the bends in the elongate integral member. The temples each have a free end, and the method further includes providing an engagement assembly for releasably retaining the free end of one of the temples to the free end of the other of the temples. Preferably, the engagement assembly includes a hook and loop fastener having an element thereof carried at the free end of one of the temples and a complemental element thereof carried at the free end of the other of the temples. Preferably, the elongate integral member is made of a foam material, and the backing is made of a foam material. In one embodiment, the step of affixing the temple pads to the inner faces of the temples, respectively, further includes adhesively affixing the temple pads to the inner faces of the temples, respectively.

Sunglasses constructed and arranged in accordance with another embodiment of the invention includes a frame portion having opposing inner and outer faces, opposed first and second sides, a nose bridge formed between the opposed first and second sides, and a lens opening formed on either side of the nose bridge. A lens-defining member, made of a flexible, thin, sun-protective, light-transmitting material, has an outer face applied to the inner face of the frame portion and an opposing inner face, and a side in juxtaposition to each of the first and second sides of the frame portion. Fasteners, each of which is preferably a rivet, affix the lens-defining member to the frame portion, and first and second temples extend rearwardly of the frame portion at the first and second sides of the frame portion, respectively. The first temple extends rearwardly of the frame portion from a first bend formed between the frame portion and the first temple at the first side of the frame portion, and a second temple extends rearwardly of the frame portion from a second bend formed between the frame portion and the second temple at the second side of the frame portion. The frame portion is coupled to the first and second temples to maintain the first and second bends between the frame portion and the first and second temples, respectively. In a particular embodiment, a crimp formed between the frame portion and the first and second temples at the first and second bends maintains the first and second bends between the frame portion and the first and second temples, respectively. An elongate band has opposed first and second ends, a first fastener affixes the first end of the elongate band to the first temple, and a second fastener affixes the second end of the elongate band to the second temple. The first and second fasteners are each preferably a rivet. A first temple pad is formed in the first temple adjacent to the first bend, and a second temple pad is formed in the second temple adjacent to the second bend.

Sunglasses constructed and arranged in accordance with yet another embodiment of the invention includes a lensed frame portion having opposed first and second sides, a first temple extending rearwardly of the lensed frame portion from a first bend formed between the lensed frame portion and the first temple at the first side of the lensed frame portion, a second temple extending rearwardly of the lensed frame portion from a second bend formed between the lensed frame portion and the second temple at the second side of the lensed frame portion, an elongate band having opposed ends, and a rivet affixing each end of the elongate band to one of the first and second temples. The lensed frame portion is coupled to the first and second temples to maintain the first and second bends between the lensed frame portion and the first and second temples, respectively. In a particular embodiment, a crimp is formed between the lensed frame portion and the first and second temples at the first and second bends maintaining the first and second bends between the lensed frame portion and the first and second temples, respectively. The lensed frame portion includes a frame portion having opposing inner and outer faces, opposed first and second sides, a nose bridge formed between the opposed first and second sides, and a lens opening formed on either side of the nose bridge, and a lens-defining member, made of a flexible, thin, sun-protective, light-transmitting material, having an outer face applied to the inner face of the frame portion and an opposing inner face, and a side in juxtaposition to each of the first and second sides of the frame portion. The lens defining member is riveted to the frame portion. A first temple pad is formed in the first temple adjacent to the first bend, and a second temple pad formed in the second temple adjacent to the second bend.

Consistent with the foregoing summary of preferred embodiments of the invention, and the ensuing disclosure, which are to be taken together, the invention also contemplates associated apparatus and method embodiments.

BRIEF DESCRIPTION OF THE DRAWINGS

Referring to the drawings.

DETAILED DESCRIPTION OF PREFERRED EMBODIMENTS

Figure 1:
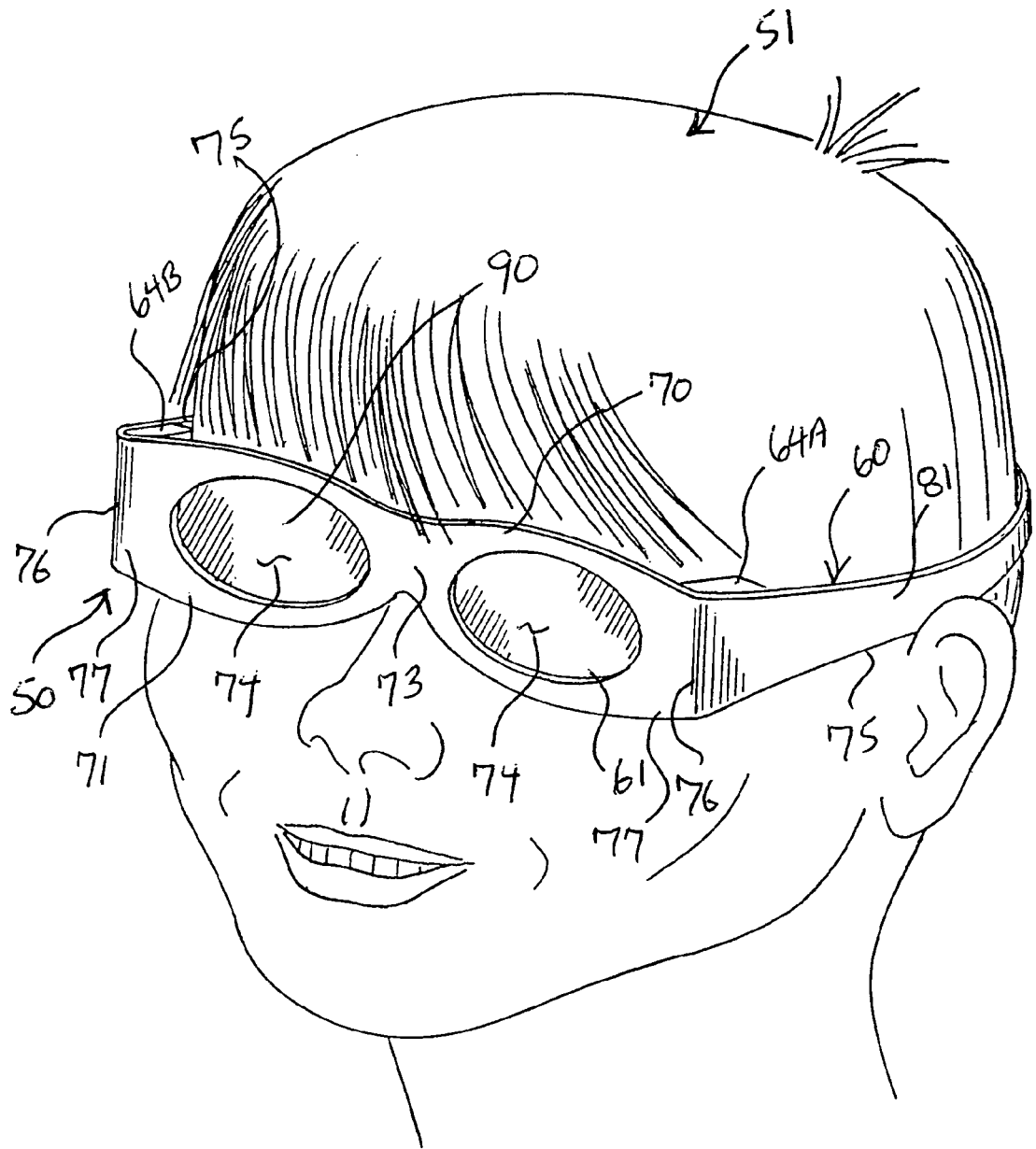
FIG. 1 is a perspective view of sunglasses, constructed in accordance with the principles of the instant invention, as they would appear worn by a user.

Turning now to the drawings, in which like reference characters indicate corresponding elements throughout the several views, attention is first directed to FIG. 1, in which are seen sunglasses, embodying the principles of the instant invention and generally designated by the reference character 50. In FIG. 1, sunglasses 50 are shown as they would appear being worn upon the head of a user, generally designated by the reference character 51.

Figure 4:
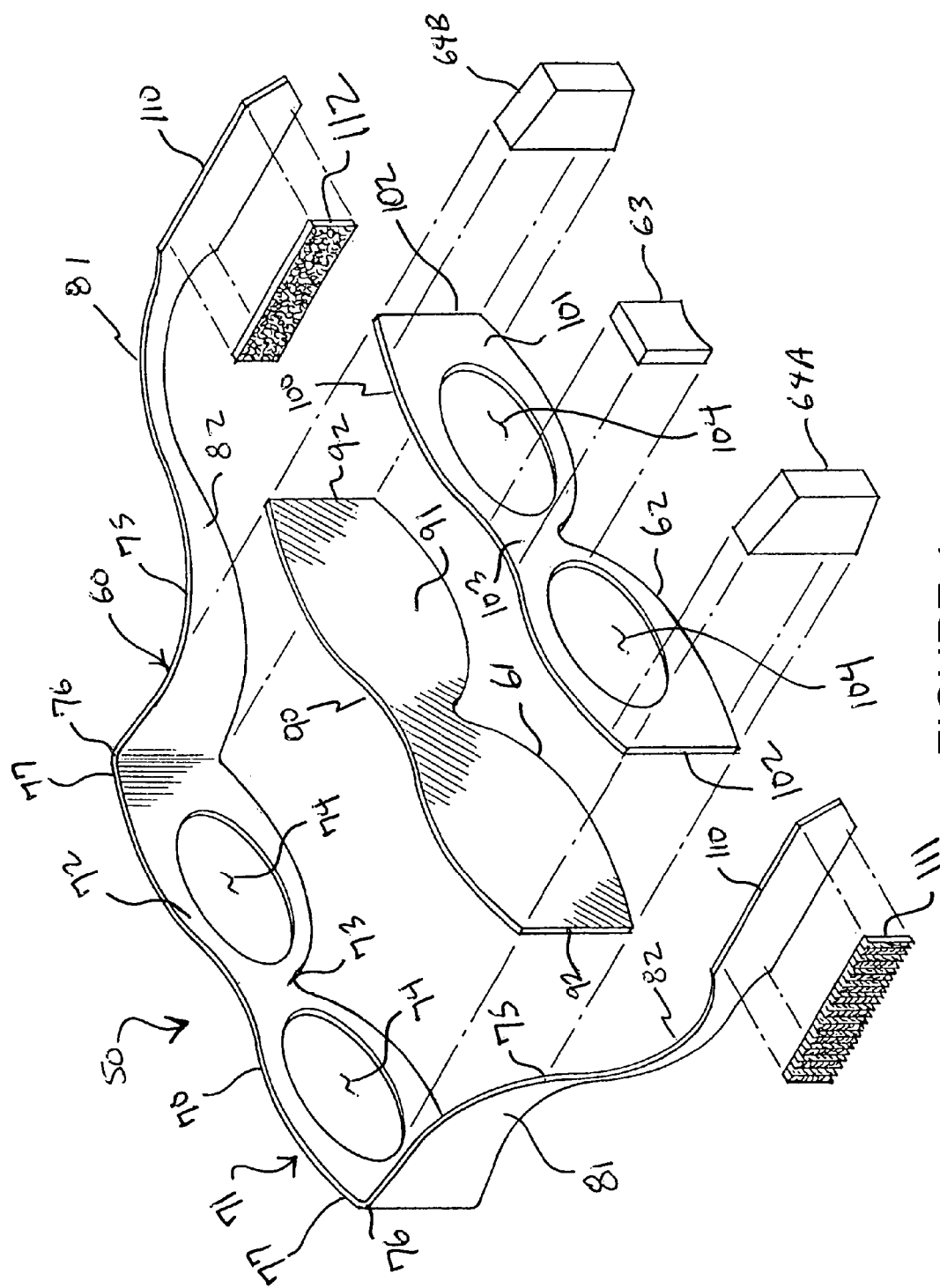
FIG. 4 is another exploded perspective view of the sunglasses of FIG. 1.

Referring to FIG. 4, sunglasses 50 includes an elongate member 60, a lens-defining member 61, and a backing 62. Further included are a nose bridge pad 63, and temple pads 64A and 64B. Member 60, backing 62, nose bridge pad 63, and temple pads 64A and 64B are each made of a foam material, such as a polyurethane-type foam material, an ethyl vinyl acetate foam material, or other similar foam material, of the same or different porosity, which is lightweight, flexible, and without sharp edges and which is printable or embossable, such as for decoration and for branding and information purposes.

Member 60 is a single, integral element formed by molding, or by cutting it away from a single piece of material. Backing 62 is also a single, integral element formed by molding, or by cutting it away from a single piece of material. Still further, nose bridge pad 64 and temple pads 64A and 64B are also single, integral elements each formed by molding, or by cutting away from a single piece of material.

Lens-defining member 61 is a single, integral piece of material made of a thin plastic light-transmitting material of a sun-protecting composition or color, preferably a thermosetting material. Lens-defining member 61 is of a type that blocks the sun's harmful UV light. Preferred materials are a high-performance Lexan™ film, or a polycarbonate film, both of which have the desirable properties of providing ultraviolet protection, being shatter and chemical resistant and lightweight and flexible. Where desired, other materials may be used, including materials suitable for forming optical lenses or curvatures prescribed for the individual wearer.

Member 60 includes a central portion 70 having opposing outer and inner faces 71 and 72, a central nose bridge 73, a lens opening 74 on each side of central nose bridge 73, and a temple 75 extending rearwardly of inner face 72 from a bend 76 in member 60 on each side 77 of central portion 70. Each temple 75 has an outer face 81 that is congruent with outer face 71 of central portion 70, and an inner face 82 that is congruent with the inner face 72 of central portion 70. Lens openings 74 are each substantially equal in size.

Lens-defining member 61 is superimposed on inner face 72 of central portion 70, and is substantially coextensive relative to central portion 70. More particular, lens-defining member 61 has opposing outer and inner faces 90 and 91, and opposing sides 92. Outer face 90 is adhesively affixed with a suitable adhesive to inner face 72 of central portion 70, being superimposed thereon and overlying lens openings 74 in which sides 92 are juxtaposed to bends 76 and, moreover, to sides 77 of central portion 70. Preferably, opposing parallel edges characterize sides 92, and bends 76 are formed thereabout these parallel edges at sides 77.

Figure 2:
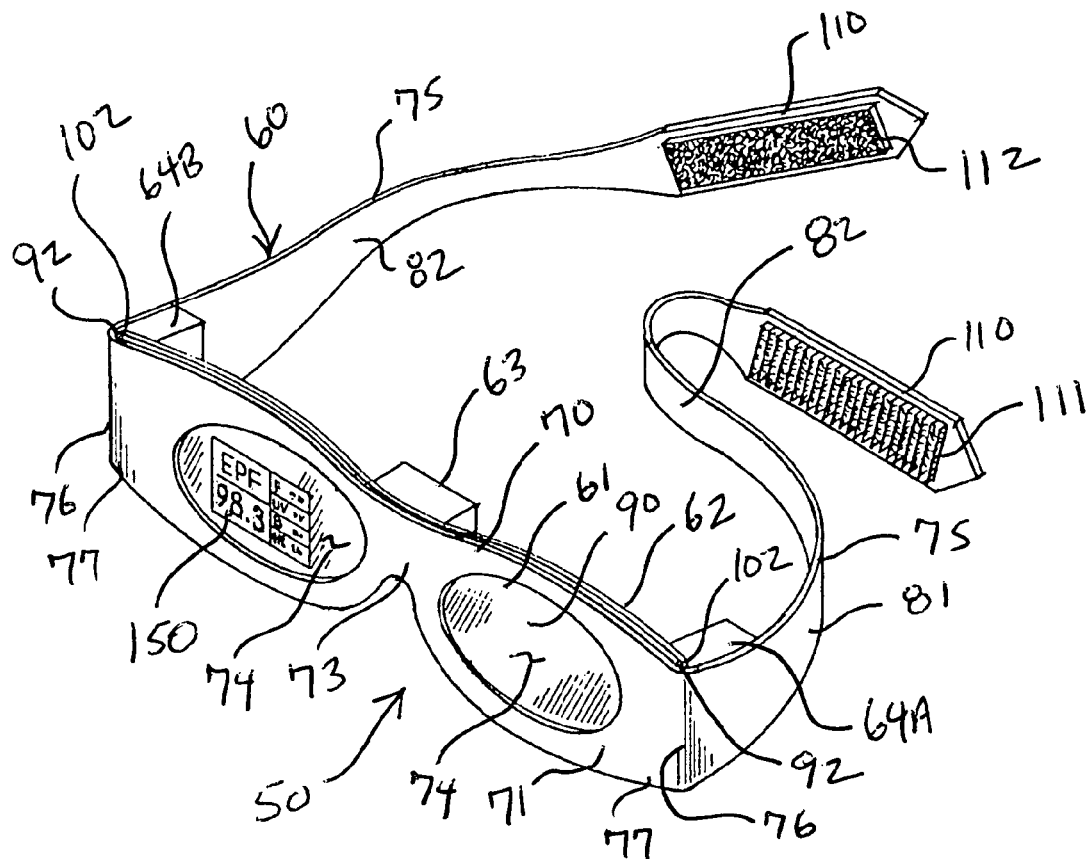
FIG. 2 is a perspective view of the sunglasses of FIG. 2.
Figure 3:
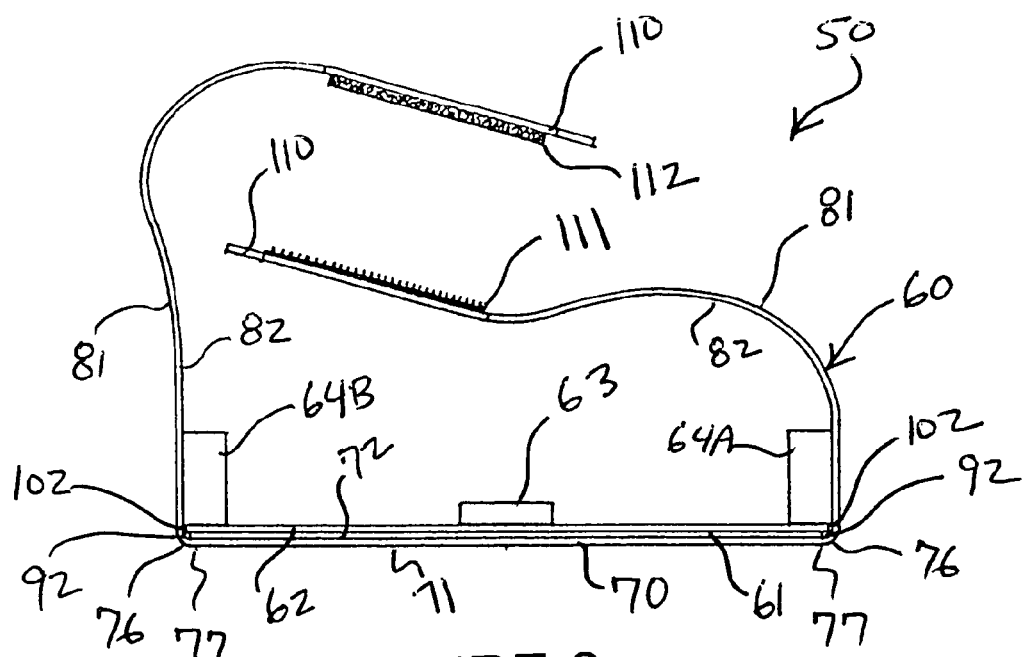
FIG. 3 is a top plan view of the sunglasses of FIG. 1.

Backing 62 is superimposed on outer face 91 of lens-defining member, and is substantially coextensive relative to, and a substantial mirror image of, central portion 70. Backing 62 is also substantially coextensive relative to lens-defining member 61. More particularly, backing 62 has opposing outer and inner faces 100 and 101, opposing sides 102, a central nose bridge 103, and lens openings 104 on each side of central nose bridge 103. Outer face 100 is adhesively affixed with a suitable adhesive to inner face 91 of lens-defining member 61, being superimposed thereon and also over central portion 70, in which lens-defining member 61 is sandwiched between inner face 72 of central portion 70 and outer face 100 of backing 62 and lens openings 104 oppose and are aligned with lens openings 74, respectively, and central nose bridge 103 opposes central nose bridge 73. Sides 102 are juxtaposed to sides 92, respectively, and to bends 76, respectively, and, moreover, to sides 77. Preferably, opposing parallel edges characterize sides 102, and bends 76 are formed not only thereabout the parallel edges of sides 92, but also the parallel edges of sides 102. The attachment of lens-defining member 61 to central portion 70, and backing 62 to lens-defining member 61, which forms a laminate lensed frame portion of sunglasses 50, is clearly shown in FIGS. 2 and 3, forming an exemplary embodiment of the invention. FIGS. 2 and 3 also show the relationship between bends 76 and sides 92 and 102 of lens-defining member 61 and backing 62, respectively.

Nose bridge pad 63 is adhesively affixed with a suitable adhesive to outer face 103 of backing 62 at nose bridge 103. Temple pads 64A and 64B are positioned in the inside corners of sunglasses 50 formed at bends 76, which bends 76 are formed by the juxtaposed inner faces of central portion 70 and temples 75, and are affixed to outer face 101 of backing 62 at sides 92, respectively, on either side of lens openings 104, and to inner faces 82 of temples 75 maintaining bends 76 in member 70, in accordance with the principle of the invention.

The attachment of nose bridge pad 63 and temple pads 64A and 64B is shown in FIGS. 2 and 3.

Each temple 75 has a free end 110, which free ends 110 are capable of being secured to one another forming a head band for securing sunglasses 50 to a user's head as shown in FIG. 1. An engagement assembly is provided for releasably securing free ends 110. Preferably, the engagement assembly includes a hook and loop fastener having an element 111 thereof carried at one free end 110, and a complemental element 112 thereof carried at the other free end 110. In this particular embodiment designated at 50, element 111 is a hook element of a hook and loop fastener, and complemental element 112 is a loop element of a hook and loop fastener. This arrangement can be reversed, if desired. Elements 111 and 112 are secured in place with a suitable adhesive, in which element 111 is disposed on outer face 81 of the free end of one temple 75, and element 112 is disposed on inner face 82 of the free end of the other temple 75, and this facilitates the convenient attachment of element 111 to complemental element 112. This arrangement can be reversed, if desired.

When sunglasses 50 are worn as in FIG. 1, outer face 101 of backing 62 is presented toward the user and nose bridge and temple pads 63, 64A, 64B are presented against user's 51 face, in which nose bridge pad 63 presents against the bridge of user's 51 nose, temple pads 64A and 64B present against user's 51 temples, and free ends 110 are releasably secured forming a head band about user's 51 head which holds sunglasses 50 in place. Nose bridge pad 63 and temple pads 64A, 64B provide the user with a comfortable fit, and function to keep the front of sunglasses away from the user's face, which prevents lens-defining member 61 from contacting the user's face and becoming obscured with sweat and other bodily oils, which prevents lens defining member 61 from fogging up, and which provides ventilation between the sunglasses and the user's face. Also, it is to be noted that the sides of temples 75 adjacent bends 76 are widened for blocking sunlight from the sides, while lens-defining member 61 blocks the sun's harmful UV light protecting the user's eye's from the sun.

Figure 10:
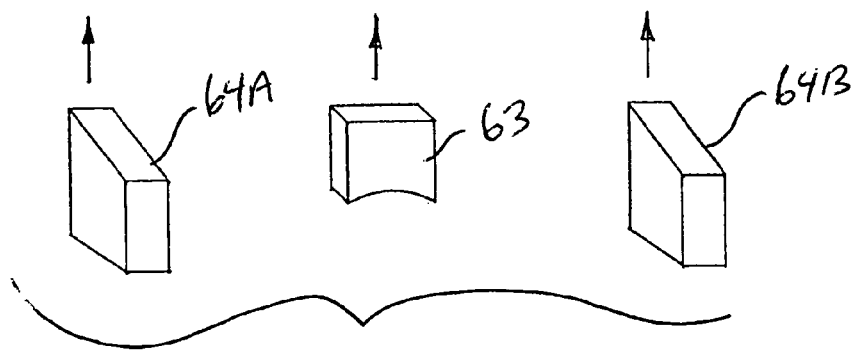
Figure 11:
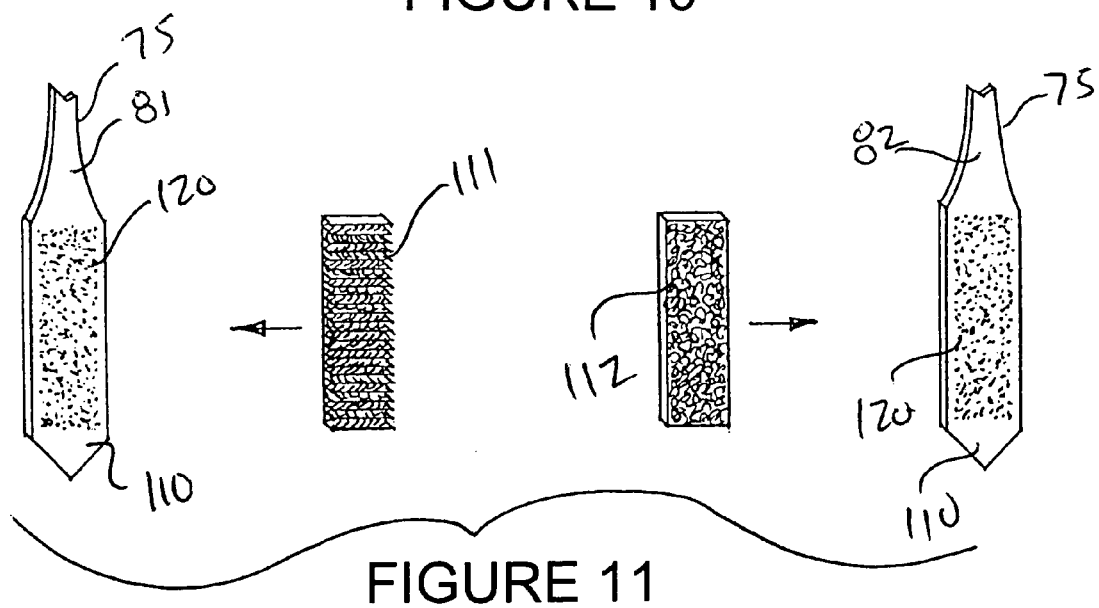

Consistent with the foregoing discussion of sunglasses, according to the invention there is provided a method of fabricating sunglasses 50 suitable for infants and children including 1) providing elongate integral member 60, elongate integral member 60 including central portion 70 (FIG. 5) having opposing outer and inner faces 71 and 72, central nose bridge 73, and a lens opening 74 on each side of central nose bridge 73; 2) providing lens-defining member 61 (FIG. 6), made of a flexible, thin, sun-protective, light-transmitting material, having opposing outer and inner faces 90 and 91, opposing sides 92, and that is substantially coextensive relative to central portion 70; 3) providing elongate integral backing 62 (FIG. 8) that is substantially coextensive relative to, and a substantial mirror image of, central portion 70, backing 62 having opposing outer and inner faces 100 and 101, opposing sides 102, central nose bridge 103, and a lens opening 104 on each side of central nose bridge 103; 4) affixing outer face 90 of lens-defining member 61 to inner face 72 of central portion 70 (FIG. 7), and affixing outer face 100 of backing 62 to inner face 91 of lens-defining member 61 (FIG. 9), wherein sides 102 of lens-defining member 61 are juxtaposed relative to sides 102 of backing 62, respectively, in accordance with the principle of the invention and forming an exemplary embodiment of the invention. In accordance with the invention, a preferred method further includes 5) bending elongate integral member 60 rearwardly of inner face 72 at the juxtaposed sides 92 and 102 of lens-defining member 61 and backing 62, respectively, forming bends 76 (FIG. 9) and temples 75 in elongate integral member 60; 6) temples 75 each having outer face 81 that is congruent to outer face 71 of central portion 70 and inner face 82 that is congruent with inner face 72 of central portion 70; 7) providing nose bridge and temple pads 63, 64A, 64B (FIG. 10); 8) affixing nose bridge pad 63 to inner face 101 of backing 62 at nose bridge 103 thereof; and 9) affixing a temple pad 64A, 64B to inner face 101 of backing 62 at each side 102 thereof and to inner face 82 of each of temples 75 maintaining bends 76 in elongate integral member 60. Temples 75 each have a free end 110, and the method further includes providing an engagement assembly for releasably retaining the free end 110 of one of temples 75 to the free end 110 of the other of temples 75 to form a head band for securing sunglasses 50 to a user's head. As previously disclosed, the engagement assembly includes a hook and loop fastener including element 111 thereof carried at free end 110 of one of temples 75 and complemental element 112 thereof carried at free end 110 of the other of temples 75. Referring to FIG. 11, the method includes providing element 111 and complemental element 112, and adhesively affixing element 111 to the free end 110 of one temple 75, and adhesively affixing complemental element 112 to the free end 110 of the other temple 75, which thus completes the fabrication of sunglasses 50 as presented in FIGS. 1-3.

Figure 5:
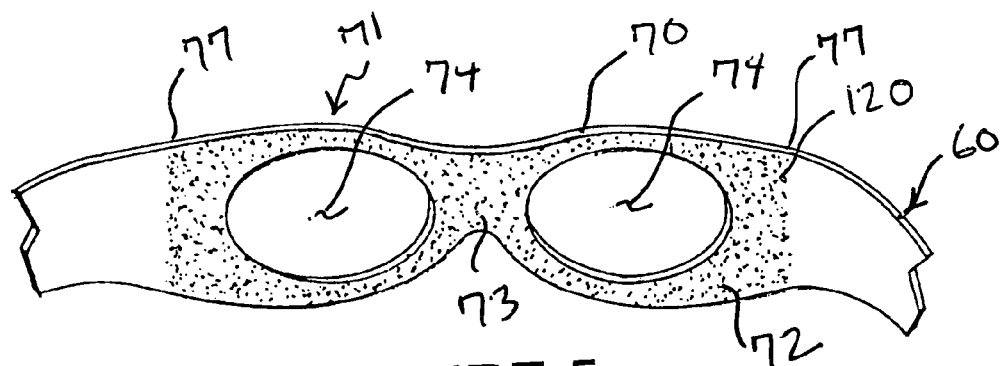
FIGS. 5-11 show the step of fabricating the sunglasses of FIG. 1.
Figure 6:
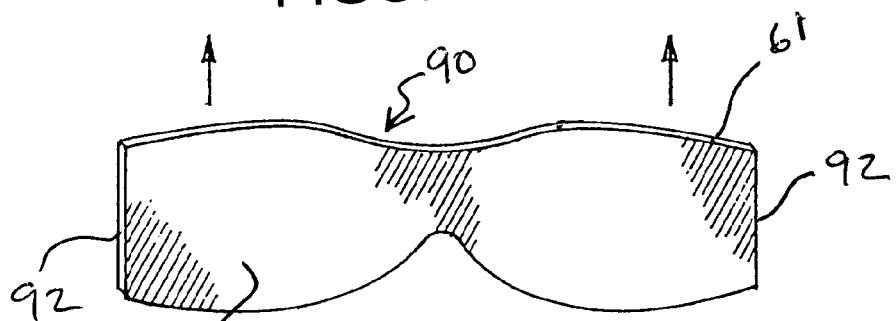
Figure 7:
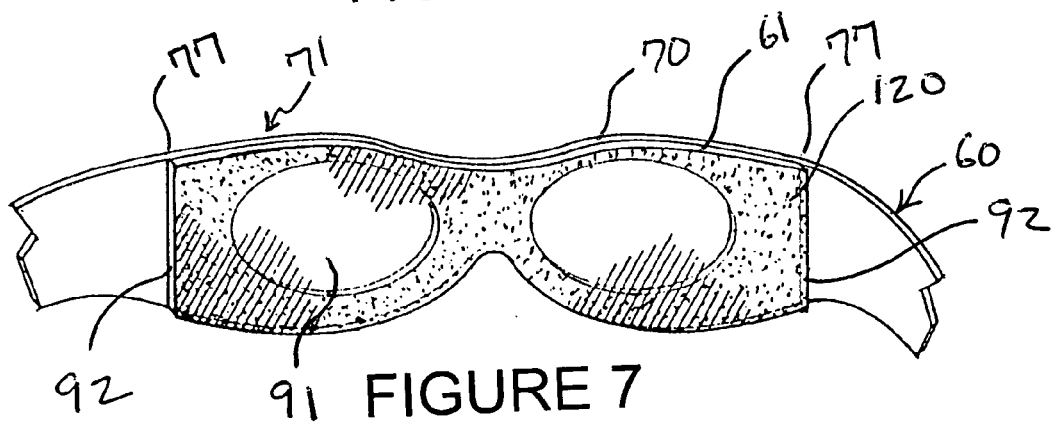
Figure 8:
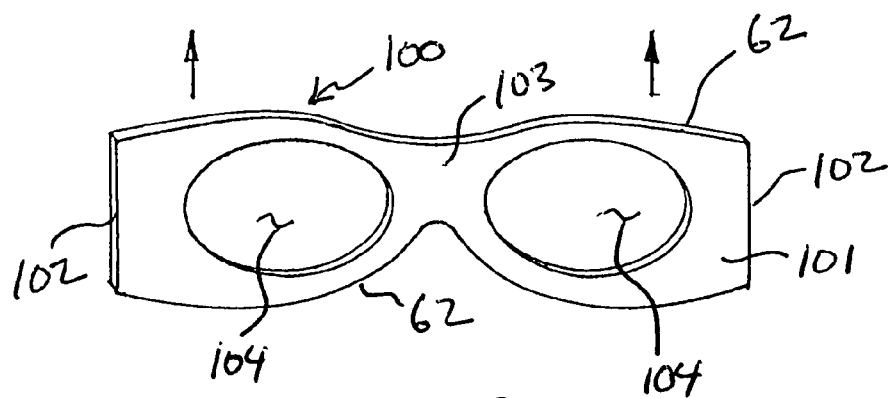

A suitable applied adhesive designated at 120 is used to affix outer face 90 of lens-defining member 61 to inner face 72 of central portion 70 (FIG. 5), and to affix outer face 100 of backing 62 to inner face 91 of lens-defining member 61 (FIG. 7). Adhesive 120 is applied with brushing, spreading, spraying, etc. In FIG. 5, adhesive 120 is applied to inner face 72 of central portion 70. In FIG. 7, adhesive 120 is applied to portions of inner face 91 of lens-defining member 61. In FIG. 11, adhesive 120 is applied to outer face 81 of the free end 110 of one temple 75 for adhesively affixing element 111, and to inner face 82 of the free end 110 of the other temple 75 for adhesively affixing element 112.

Figure 9:
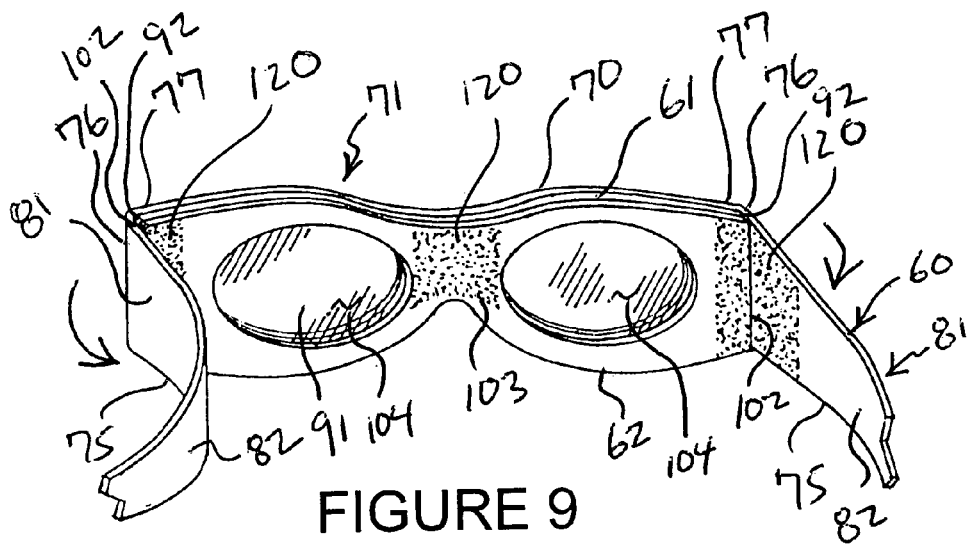

The step of affixing nose bridge pad 63 to inner face 101 of backing 62 at nose bridge 103 includes adhesively affixing a surface of nose bridge pad 63 to inner face 101 of backing 62 at nose bridge 103 with a suitable applied adhesive. In FIG. 9, adhesive 120 is applied to inner face 101 of backing 62 at nose bridge 103, which is used to adhesively affix nose bridge pad 63. The step of affixing a temple pad 64A, 64B to inner face 101 of backing 62 at each side 102 thereof further includes adhesively affixing a surface of temple pad 64A, 64B to inner face 101 of backing 62 at each side thereof. Furthermore, the step of affixing a temple pad 64A, 64B to inner face 82 of each of temples 75 further includes adhesively affixing a surface of temple pad 64A, 64B to inner face 82 of each of temples 75. In FIG. 9, adhesive 120 is applied to inner face 101 of backing 62 at each side 102 thereof, and to inner face 82 of each of temples 75, which is used to adhesively affix the surfaces of temple pads 74A, 74B.

Figure 12:
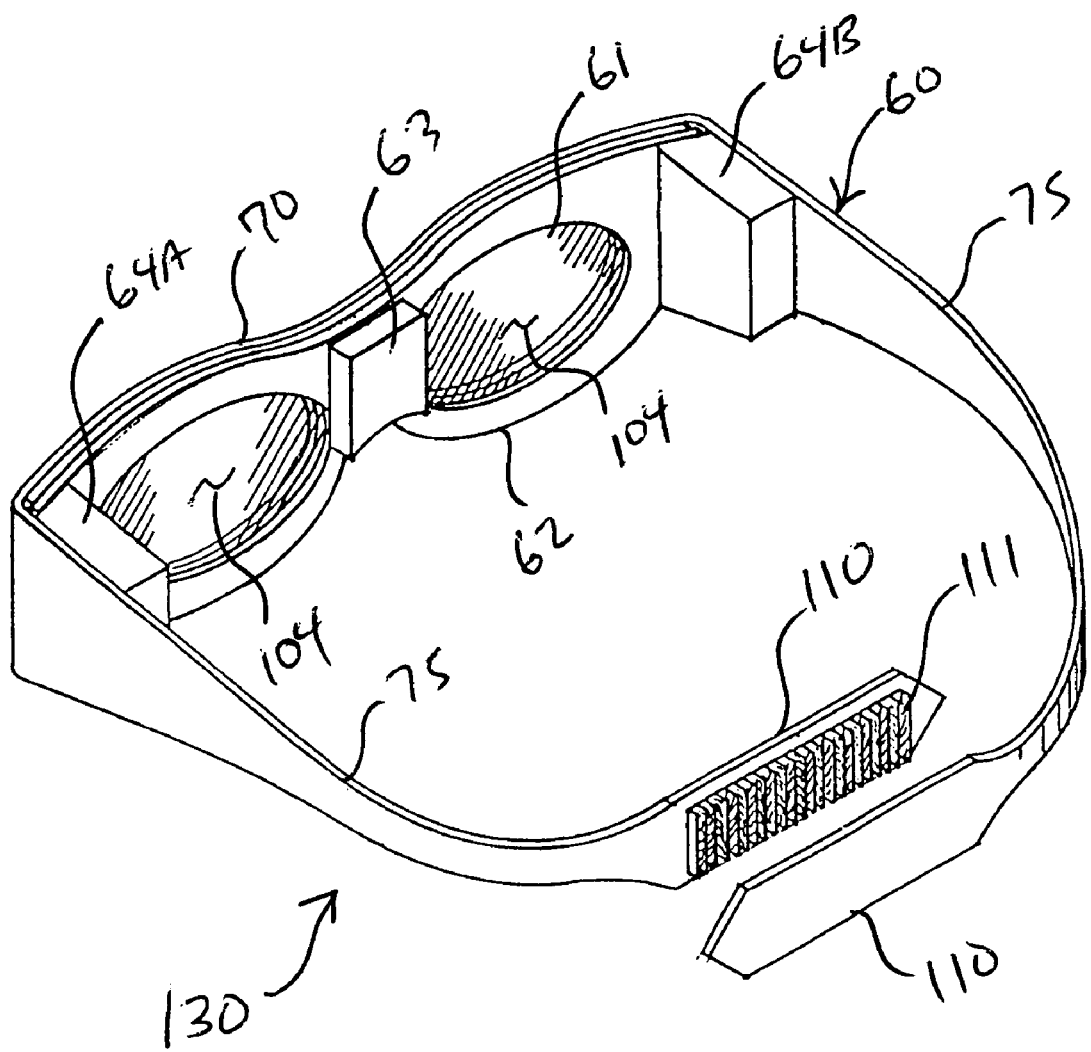
FIG. 12 is a perspective view of an alternate embodiment of sunglasses, constructed in accordance with the principles of the instant invention.
Figure 13:
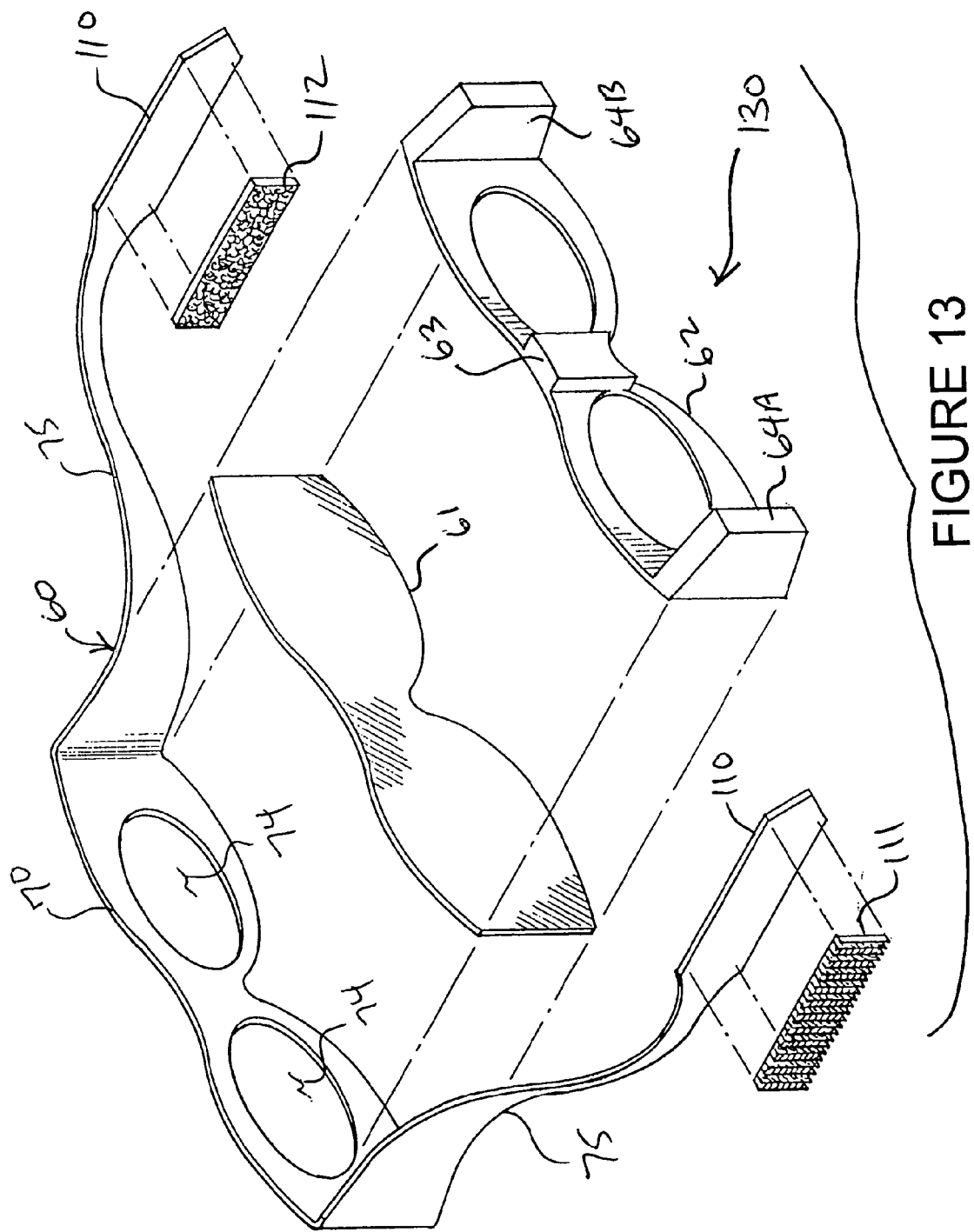
FIG. 13 is an exploded perspective view of the sunglasses of FIG. 12.

Reference is now made to FIGS. 12 and 13, in which there is seen an alternate embodiment of sunglasses designated generally at 130, embodying the principles of the instant invention. Save one difference, sunglasses 130 are fashioned of the same materials and are identical to sunglasses 50 and include the same elements including elongate member 60, lens-defining member 61, backing 62, nose bridge pad 63, and temple pads 64A and 64B, and the foregoing discussion of sunglasses 50 and the associated fabrication method applies to sunglasses 130, save for the one intimated difference. Unlike sunglasses 50, nose bridge pad 63 and temple pads 64A, 64B of sunglasses 130 are integrally formed with backing 62, in which backing consists of an integral or single unit or piece formed with nose bridge pad 63 and temple pads 64A, 64B. Other than this one difference, the structure of sunglasses 130 and its fabrication method are the same in all respects to the structure of sunglasses 50 and its fabrication method. Because nose bridge pad 63 and temple pads 64A, 64B are integral with backing 62, such as through molding or by cutting backing 62 from a single piece of material, nose bridge pad 63 and temple pads 64A, 64B are "integrally affixed," meaning that they are affixed to backing 62 by way of an integral affixation or formation. So, although nose bridge pad 63 and temple pads 64A, 64B of sunglasses 50 are adhesively affixed to backing 62, nose bridge pad 63 and temple pads 64A, 64B are integrally affixed to backing 62.

Figure 15:
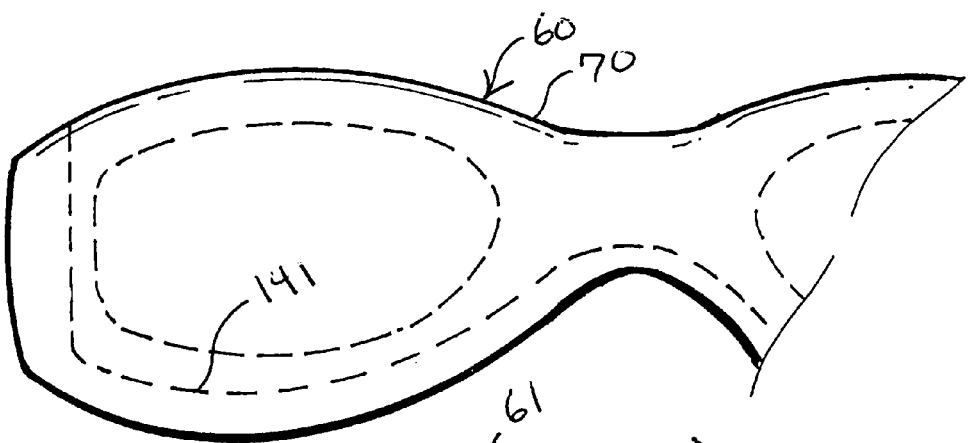
FIG. 15 is fragmentary, front schematic representation of the sunglasses of FIG. 14.
Figure 14:
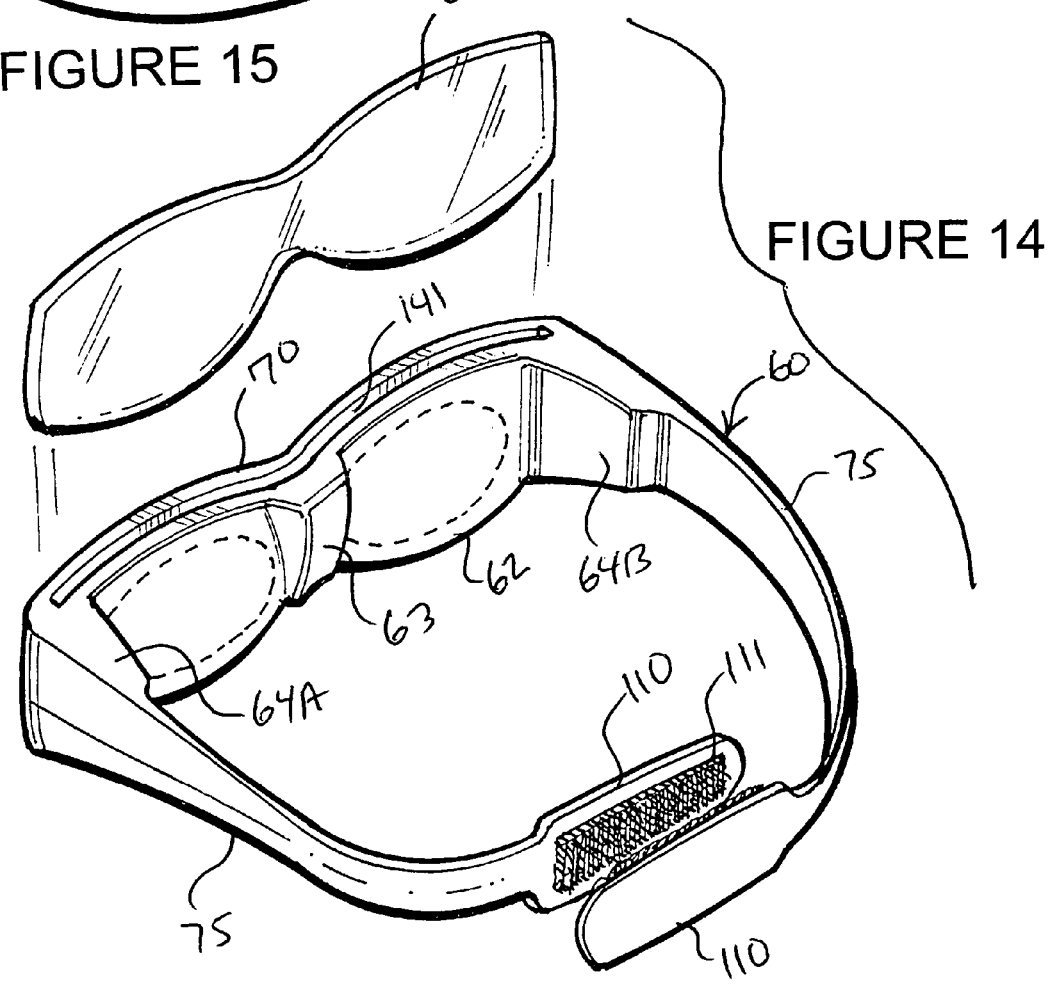
FIG. 14 is an exploded perspective view of yet another alternate embodiment of sunglasses, constructed in accordance with the principles of the instant invention.
Figure 16:
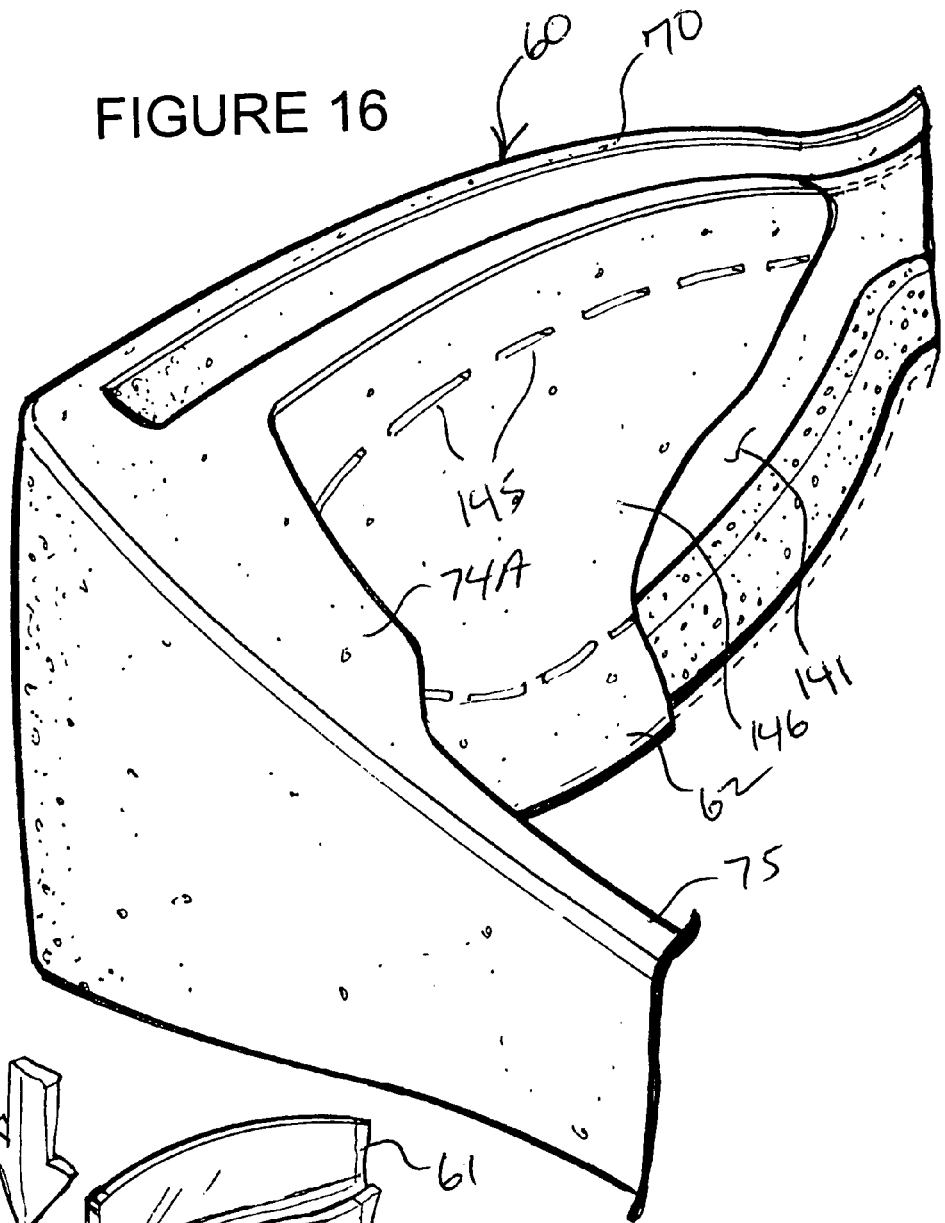
FIG. 16 is an enlarged fragmentary perspective view of the sunglasses of FIG. 14.
Figure 17:
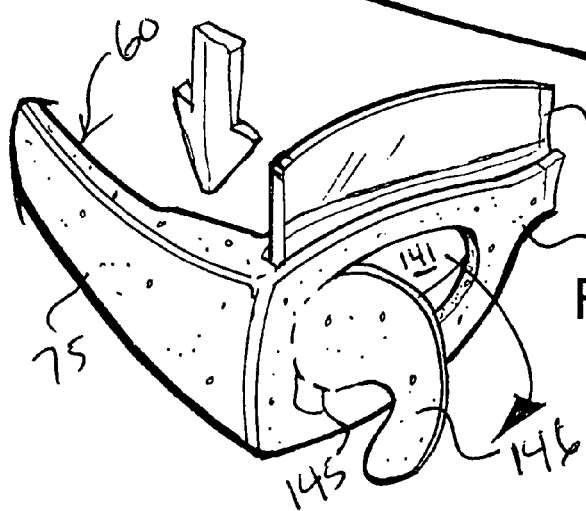
FIG. 17 is a fragmentary perspective view of the sunglasses of FIG. 14 with the lens-defining member shown as it would appear being inserted into a pocket of the sunglasses.

Referring to FIGS. 14-17, there is seen yet another alternate embodiment of sunglasses designated generally at 140, embodying the principles of the instant invention. Save two differences, sunglasses 140 are fashioned of the same materials and are identical to sunglasses 130 and include the same elements including elongate member 60, lens-defining member 61, and backing 62 including nose bridge pad 63, and temple pads 64A and 64B, and it is to be understood that the foregoing discussion of sunglasses 130 applies to sunglasses 130, save for the two intimated differences. Unlike sunglasses 130, member 60 and backing 62, including nose bridge pad 63 and temple pads 64A and 64B, are integrally formed as a single unit or frame, such as through molding or cutting from a single piece of material. A pocket 141 is formed between central portion 70 and backing 62, which accepts lens-defining member 61. Pocket 141 can be formed during a molding process, or by cutting, such as with a laser, knife, or other cutting or milling device. A suitable adhesive is used to adhesively affix lens-defining member 61 in pocket 141. FIG. 15 is a fragmentary, front schematic representation of the frame of FIG. 14, in which the boundary of pocket 141 is denoted in dotted outline.

Lens openings 74 (not shown) through central portion 70 and lens openings 104 (not shown) through backing 62 can be formed before lens-defining member 61 is positioned in pocket 141, or after. On the subject of the latter, and with reference to FIGS. 16 and 17, each lens opening can be formed by forming a parametric or continuous perforate line 145 defining a boundary of a lens opening and an internal section 146 of the frame that can be torn away or separated from the perforate line 145 to form the lens opening.

In sum, disclosed herein are exemplary embodiments of sunglasses which are specifically adapted to be worn by infants and children, which are easy to make, which are comfortable to wear, which have no sharp edges, which are disposable, and which are inexpensive. Preferably, the lens-defining member of the various embodiments of the invention has approximately a 98 Eye Protection Factor (EPF) according to the protective rating system for eyewear disclosed in U.S. Pat. No. 5,949,535, which is incorporated by referenced herein. As a matter of example, a removable, adhesive label 150 is applied to lens-defining member 61 in FIG. 2 which references an approximate 98 EPF. Providing lens-defining member with an EPF of approximately 98 ensures that sunglasses constructed and arranged in accordance with the principle of the invention will provide a user with exemplary protection from the sun's harmful UV light. Lens-defining member 61 can be provided with any predetermined EPF as may be desired.

Reference is now made to FIGS. 18-24 illustrating yet a further embodiment of sunglasses, embodying the principles of the instant invention and generally designated by the reference character 200. Referencing FIGS. 18-20, sunglasses 200 includes an elongate member 201, a lens-defining member 202, and an elongate band 203. Member 201 and band 203 are each made of a foam material, such as a polyurethane-type foam material, an ethyl vinyl acetate foam material, or other similar foam material, of the same or different porosity, which is lightweight, flexible, and without sharp edges and which is printable or embossable, such as for decoration and for branding and information purposes.

Figure 21:
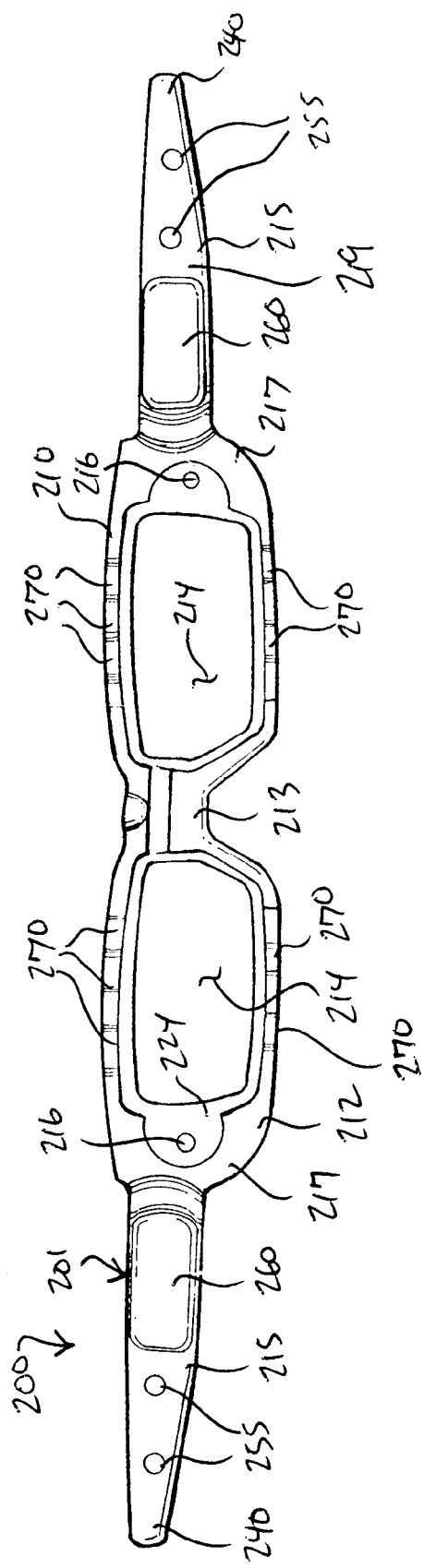
FIG. 21 is a rear elevational view of an elongate member of the sunglasses of FIG. 18 shown as it would appear splayed out.
Figure 22:
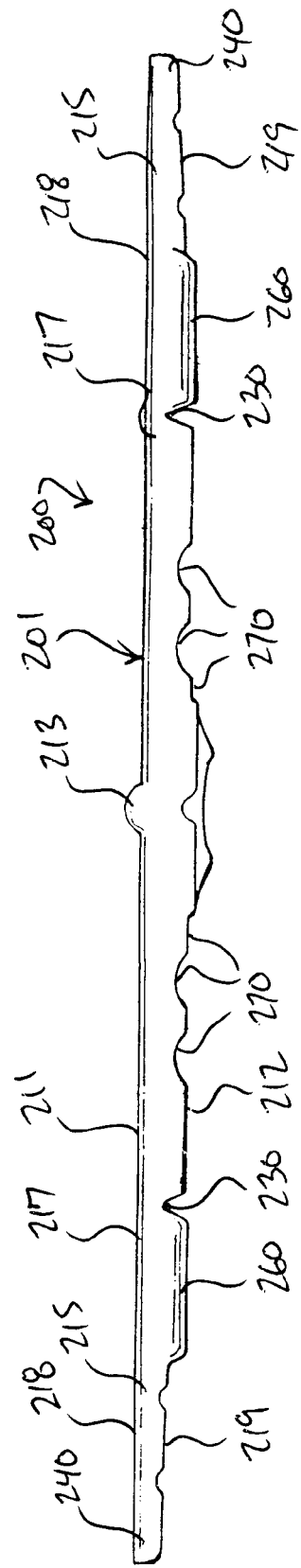
FIG. 22 is a top plan view of the elongate member of FIG. 21 shown as it would appear splayed out.

Member 201, which is also illustrated in FIGS. 21 and 22, is a single, integral element formed by molding, or by cutting it away and forming it from a single piece of material. Lens-defining member 202 is a single, integral piece of material made of a thin plastic light-transmitting material of a sun-protecting composition or color, preferably a thermosetting material. Lens-defining member 202 is of a type that blocks the sun's harmful UV light. Preferred materials are a high-performance Lexan™ film, or a polycarbonate film, both of which have the desirable properties of providing ultraviolet protection, being shatter and chemical resistant and lightweight and flexible. Where desired, other materials may be used, including materials suitable for forming optical lenses or curvatures prescribed for the individual wearer.

Figure 18:
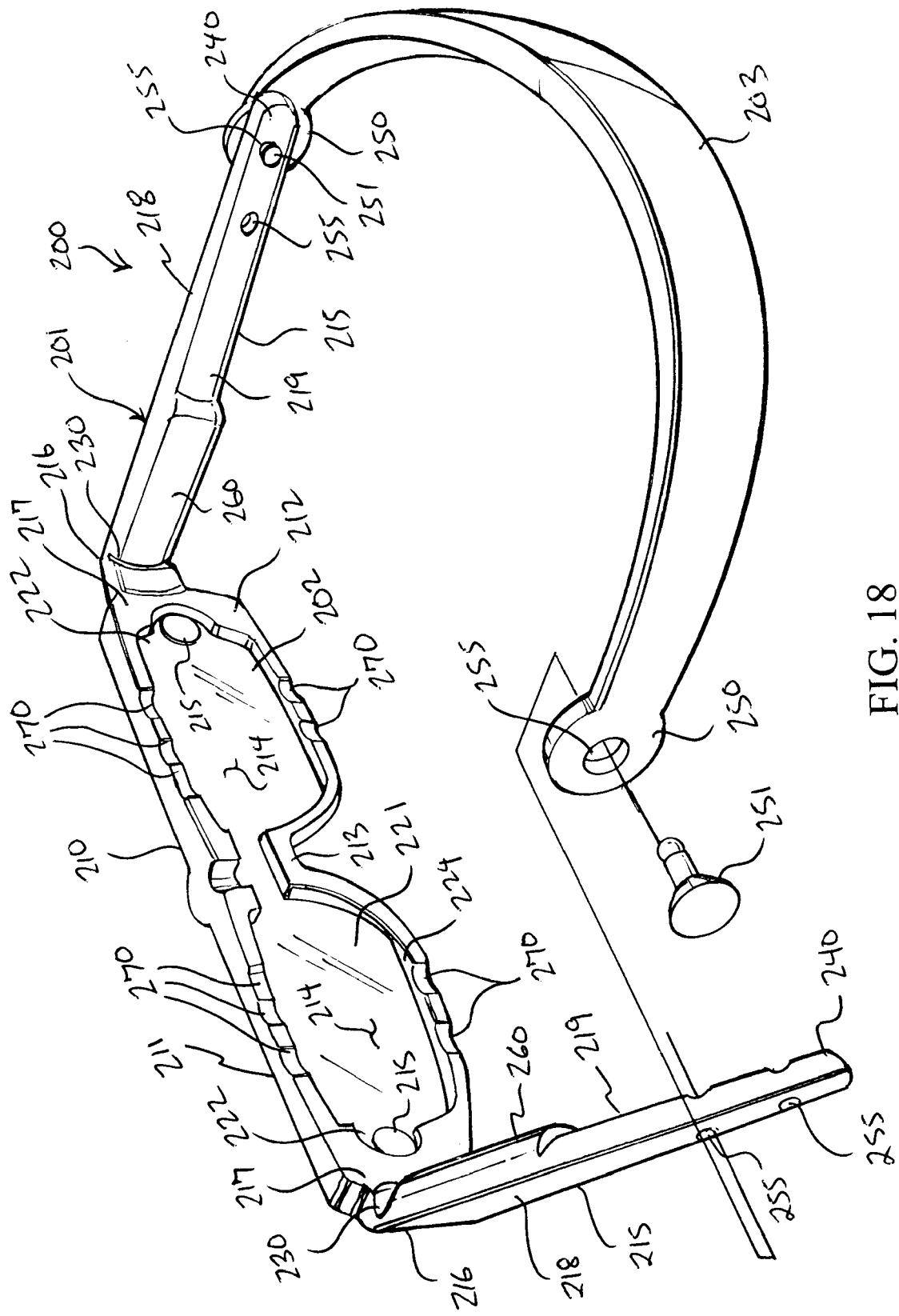
FIG. 18 is a partially-exploded front perspective view of an alternate embodiment sunglasses, constructed in accordance with the principles of the instant invention.
Figure 19:
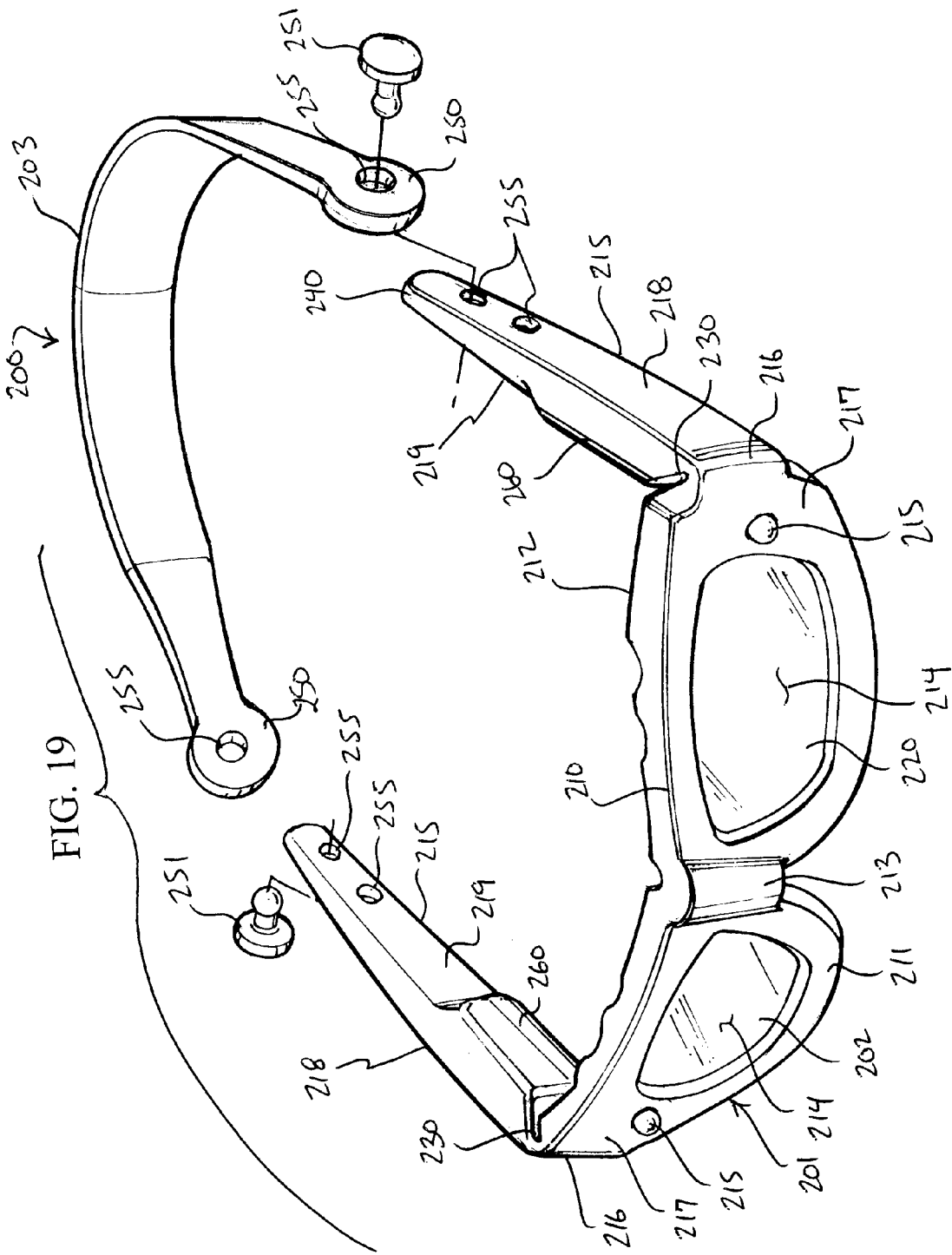
FIG. 19 is a partially-exploded rear perspective view of the sunglasses of FIG. 18.
Figure 20:
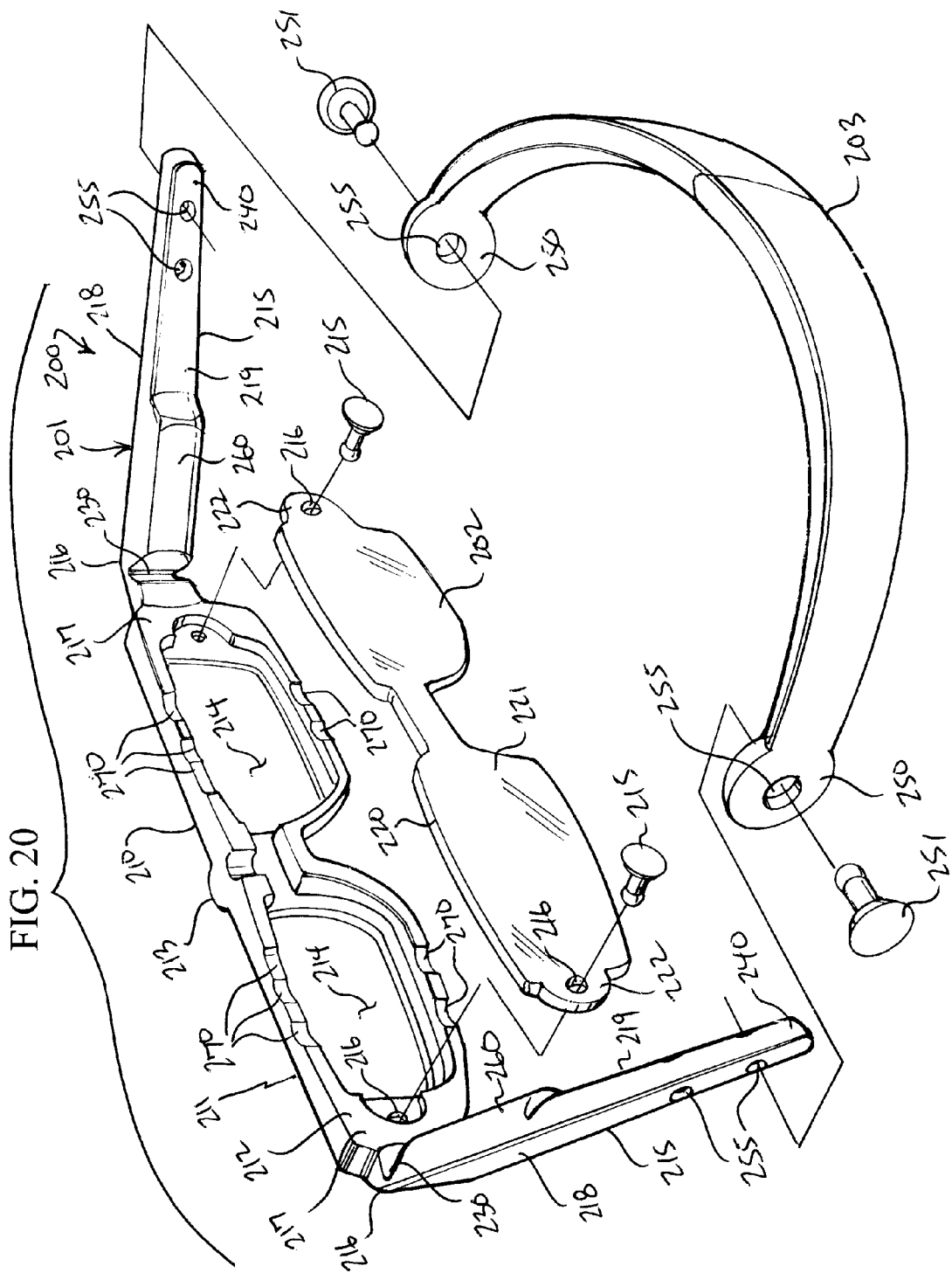
FIG. 20 is an exploded rear perspective view of the sunglasses of FIG. 18.

Referencing in relevant part FIGS. 18-22, member 201 includes a central portion 210 having opposing outer and inner faces 211 and 212, a central nose bridge 213, a lens opening 214 on each side of central nose bridge 213, and, as best illustrated in FIGS. 18-20, a temple 215 extending rearwardly of inner face 212 from a bend 216 in member 201 on each side 217 of central portion 210. Each temple 215 has an outer face 218 that is congruent with outer face 211 of central portion 210, and an inner face 219 that is congruent with the inner face 212 of central portion 210. Lens openings 214 are each substantially equal in size. Central portion 210 forms a frame portion of sunglasses 200.

Lens-defining member 202 is superimposed on, or otherwise applied to, inner face 212 of central portion 210, and is substantially coextensive relative to central portion 210 being superimposed thereon and overlying lens openings 214 in which sides 222 are juxtaposed to sides 217 of central portion 210. Lens-defining member 61 has an outer face 220 denoted in FIG. 19 and an opposing inner face 221 denoted in FIGS. 18 and 20, and opposed sides 222 denoted in FIGS. 18 and 20. Referencing FIGS. 18, 20, and 21, a recess 224 is formed in inner face 212 of central portion 210 that accepts lens-defining member 201 as illustrated in FIG. 18. Outer face 90 is applied to recess 224 formed in inner face 212 of central portion 210 and is secured or otherwise affixed in place to central portion 210 with fasteners 225 denoted in FIGS. 18-20. In the present embodiment, fasteners 225 are applied to sides 222, respectively, of lens-defining member 202 securing sides 222 of lens-defining member 202 to sides 217, respectively, of central portion 210.

Figure 23:
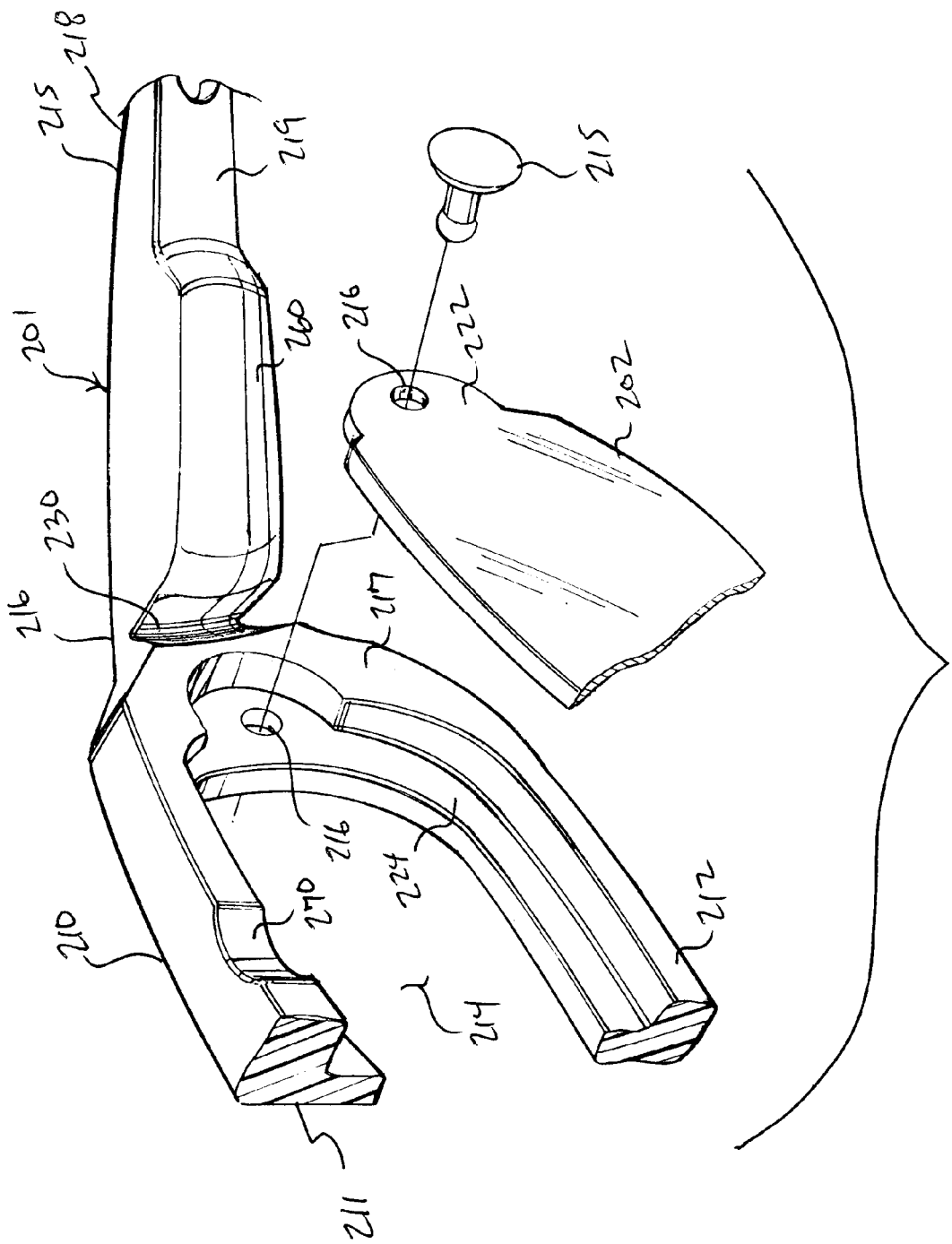
FIG. 23 is an enlarged, fragmented, exploded rear perspective view of the sunglasses of FIG. 18.
Figure 24:
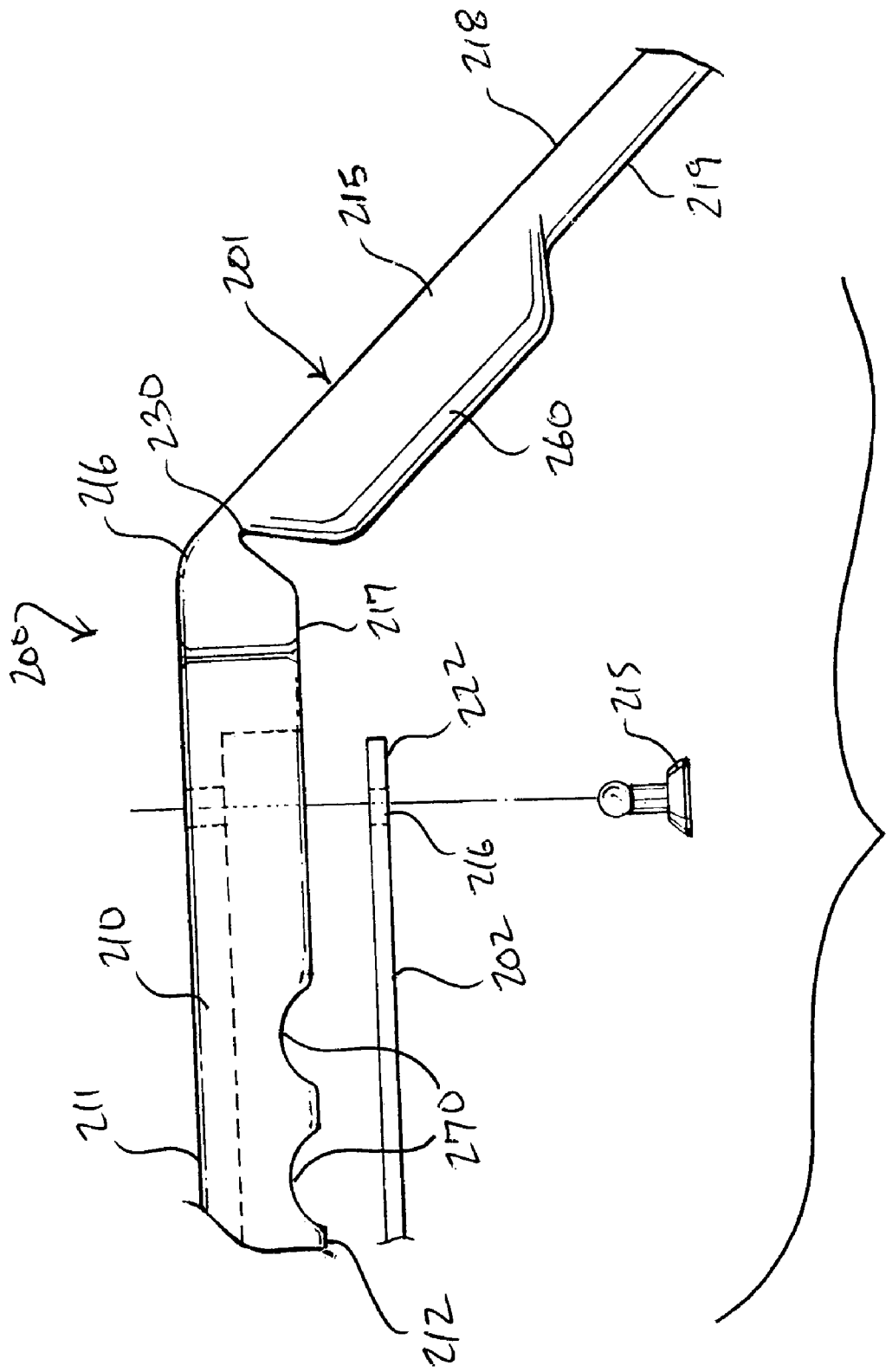
FIG. 24 is an enlarged, fragmented, exploded top plan view of the sunglasses of FIG. 18.

Referencing in relevant part FIGS. 20, 23, and 24, in the preferred embodiment set forth herein, fasteners 225 are rivets, which are received by corresponding openings 216 (FIG. 20) formed in sides 222 and 217, respectively, of lens-defining member 201 and central portion 210 thereby securing lens-defining member 201 to central portion 210. If desired, a rivet can be applied between lens-defining member 201 and nose bridge 213. Rivets can be applied between lens-defining member 201 and central portion 210 at any selected locations suitable to secure lens-defining member 201 to central portion 210. FIGS. 18 and 19 show sunglasses 200 illustrated with lens-defining member 201 secured to central portion 210 with fasteners 225 forming a lensed frame portion of sunglasses 200. In other words, the combination of lens-defining member 201 secured to central portion 210 forms a lensed frame member of sunglasses 200.

As previously mentioned, temples 215 extending rearwardly of inner face 212 from bends 216, respectively, in member 201 on each side 217 of central portion 210. Bends 216 are formed between central portion 210 and temples 215 at sides 217 of central portion 210. Central portion 210 is coupled to temples 215 to maintain bends 216 between central portion 210 and temples 216, in accordance with the principle of the invention. In accordance with the preferred embodiment as illustrated in FIGS. 18-20, 23, and 24, a crimp 230 is formed in member 201 between central portion 210 and temples 215 at bends 216 that maintain bends 216 between central portion 210 and temples 215, respectively, in accordance with the principle of the invention. FIGS. 23 and 24 are enlarged fragmented views of sunglasses 200 illustrating a crimp 230 formed in elongate member 201 between central portion 210 and a temple 215 maintaining bend 216 formed in elongate member 201 between central portion 210 and temple 215.

As illustrated in FIGS. 18-22, each temple 215 has a free end 240. Referencing FIGS. 18-20, band 203 is elongate and has opposed ends 250. Fastener 251 secure ends 250 of band 203 to temples 215, respectively, forming a head band to secure sunglasses 200 to a user's head, in accordance with the principle of the invention. In the present embodiment, fasteners 251 are applied between ends 250 of band 203 and temples 215, respectively, securing ends 250 of band 203 to temples 215, respectively, to form the head band. In the preferred embodiment set forth herein, fasteners 251 are rivets, which are received by corresponding openings 255 formed in ends 250 of band 203 and temples 215 thereby securing lens-defining member 201 to central portion 210. In the present embodiment, temples 215 each incorporate two spaced-apart openings 255 formed adjacent to the corresponding end 250 defining different engagement points for a corresponding end 250 of band 203 allowing a user to adjust the size of the formed head band to allow sunglasses 200 to be adjusted as needed to fit heads of differing sizes, in accordance with the principle of the invention. Any number of openings 255 can be formed in temples 215 to provide different engagement points for ends 250 of band 203 as may be desired.

When sunglasses 200 are worn, inner face 212 of sunglasses 200 is presented toward the user and nose bridge 213 and temples 215 are presented against the user's face, in which nose bridge 213 presents against the bridge of the user's nose, and temples 215 present along and against the user's temples, and ends 250 of band 203 are secured or otherwise affixed to temples 215 with fasteners 251 forming a head band about the user's head holding sunglasses 200 in place. To provide enhanced comfort, as illustrated in FIGS. 18-22 a temple pad 260 is formed in inner face 219 of each temple 215 adjacent to each bend 216, which are received against the user's temples when sunglasses 200 are worn. As referenced in FIGS. 18 and 20, a series of notches 270 are formed in inner face 212 of central portion 210 of sunglasses 200 allowing air to circulate between the user's face and lens-defining member 202 thereby preventing lens-defining member 202 from fogging over during use and for providing the user with enhanced comfort by providing ventilation between the user's face and sunglasses 200.

The present invention is described above with reference to preferred embodiments. However, those skilled in the art will recognize that changes and modifications may be made in the described embodiments without departing from the nature and scope of the present invention. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same.

The invention claimed is:

1. Sunglasses, comprising:
an elongate, integral member constructed of a foam material, and which forms a frame portion having opposing inner and outer faces, opposed first and second sides, a nose bridge formed between the opposed first and second sides, and a lens opening formed on either side of the nose bridge, and first and second temples formed at the first and second sides, respectively, of the frame portion;
the first temple extending rearwardly of the frame portion from a first bend formed between the frame portion and the first temple at the first side of the frame portion;
the second temple extending rearwardly of the frame portion from a second bend formed between the frame portion and the second temple at the second side of the frame portion;
a crimp formed in the elongate integral member between the frame portion and the first and second temples at the first and second bends maintaining the first and second bends between the frame portion and the first and second temples, respectively;
a lens-defining member, made of a flexible, thin, sun-protective, light-transmitting material, having an outer face applied to the inner face of the frame portion and an opposing inner face, and a side in juxtaposition to each of the first and second sides of the frame portion; and
fasteners affixing the lens-defining member to the frame portion.

2. Sunglasses according to claim 1, wherein the fasteners each comprise a rivet.

3. Sunglasses according to claim 1, further comprising:
an elongate band having opposed first and second ends; and
a first fastener affixing the first end of the elongate band to the first temple; and
a second fastener affixing the second end of the elongate band to the second temple.

4. Sunglasses according to claim 3, wherein the first and second fasteners each comprise a rivet.

5. Sunglasses according to claim 1, further comprising:
a first temple pad formed in the first temple adjacent to the first bend; and
a second temple pad formed in the second temple adjacent to the second bend.

* * * * *